(12) United States Patent
Breuer et al.

(10) Patent No.: US 7,239,340 B2
(45) Date of Patent: Jul. 3, 2007

(54) DRAW FRAME INCLUDING A SLIVER QUALITY SENSING CAMERA

(75) Inventors: Achim Breuer, Aachen (DE); Christoph Färber, Korschenbroich (DE)

(73) Assignee: Trutzschler GmbH & Co. KG, Monchengladbach (DE)

( * ) Notice: Subject to any disclaimer, the term of this patent is extended or adjusted under 35 U.S.C. 154(b) by 524 days.

(21) Appl. No.: 10/000,454

(22) Filed: Dec. 4, 2001

(65) Prior Publication Data

US 2002/0067410 A1 Jun. 6, 2002

(30) Foreign Application Priority Data

Dec. 4, 2000 (DE) .................. 100 60 227

(51) Int. Cl.
*H04N 7/18* (2006.01)
(52) U.S. Cl. .................................... 348/143
(58) Field of Classification Search ............... 348/143, 348/88, 86, 92, 128; 382/141, 100, 206, 382/207, 28, 287, 294, 306, 151, 190, 195
See application file for complete search history.

(56) References Cited

U.S. PATENT DOCUMENTS

| | | | | |
|---|---|---|---|---|
| 3,829,751 A | * | 8/1974 | Bottone | 318/645 |
| 4,575,065 A | * | 3/1986 | Jung et al. | 270/30.12 |
| 5,367,746 A | * | 11/1994 | Clement et al. | 19/115 |
| 5,394,591 A | * | 3/1995 | Jornot et al. | 19/240 |
| 5,400,476 A | * | 3/1995 | White | 19/239 |
| 5,533,145 A | * | 7/1996 | Shofner et al. | 382/141 |
| 5,544,390 A | | 8/1996 | Hartung et al. | |
| 5,692,267 A | | 12/1997 | Leifeld | |
| 6,088,094 A | | 7/2000 | Chu et al. | |
| 6,088,882 A | | 7/2000 | Leifeld | |
| 6,603,887 B1 | * | 8/2003 | Focke et al. | 382/287 |

FOREIGN PATENT DOCUMENTS

CH 643 060 5/1984

(Continued)

OTHER PUBLICATIONS

Jungmichel, "tpi Zeitschriftenreferate", textil praxis international Feb. 1990, pp. 116, 117.

(Continued)

*Primary Examiner*—Tung Vo
*Assistant Examiner*—Behrooz Senfi
(74) *Attorney, Agent, or Firm*—Venable LLP; Robert Kinberg; Steven J. Schwarz

(57) ABSTRACT

A draw frame for drafting a sliver includes a drafting unit having a plurality of roll assemblies spaced from one another in a direction of sliver advance. One of the roll assemblies is an output roll assembly situated at a downstream end of the drafting unit as viewed in the direction of sliver advance. A sliver guide is disposed downstream of the output roll assembly and a sliver trumpet is disposed downstream of the sliver guide. The sliver passes through the sliver guide and the sliver trumpet. An electronic camera is arranged to capture images of the sliver at a location which is downstream of the output roll assembly and upstream of the sliver trumpet. An electronic image evaluating unit is connected to the camera for receiving image signals therefrom.

18 Claims, 3 Drawing Sheets

FOREIGN PATENT DOCUMENTS

| | | |
|---|---|---|
| DE | 38 03 353 | 8/1989 |
| DE | 38 34 110 | 4/1990 |
| DE | 44 38 882 | 5/1996 |
| DE | 195 05 421 | 8/1996 |
| DE | 195 14 039 | 10/1996 |
| DE | 196 04 499 | 10/1996 |
| DE | 195 44 632 | 6/1997 |
| DE | 39 28 279 | 5/1998 |
| DE | 198 19 728 | 3/1999 |
| DE | 198 30 395 | 1/2000 |
| EP | 0 545 129 A1 | 6/1993 |
| GB | 2 326 888 A | 1/1999 |
| WO | WO 99/54532 A1 | 10/1999 |

OTHER PUBLICATIONS

Mazura et al, "SliverMaster—Qualitätssicherung in der Spinnerei-Vorbereitung", Melliand Textilberichte Oct. 1995 pp. 802, 804.

* cited by examiner

DRAW FRAME INCLUDING A SLIVER QUALITY SENSING CAMERA

CROSS REFERENCE TO RELATED APPLICATION

This application claims the priority of German Application No. 100 60 227.4 filed Dec. 4, 2000, which is incorporated herein by reference.

BACKGROUND OF THE INVENTION

This invention relates to a quality sensing device arranged at the output of a draw frame. The sliver, as it emerges from the output roll assembly of the drafting unit, passes through a sliver guide and a sliver trumpet, and the quality of the sliver may be measured.

In practice the quality of the drafted sliver is analyzed by examining the finished sliver outputted by the draw frame. The quality of the sliver, particularly the CV value of the mass uniformity, the mixture ratio and the sliver number is measured as the sliver passes through the sliver trumpet. In this arrangement a determination of, for example, the sliver mass deviations may be made only as related to the entire cross section of the sliver.

SUMMARY OF THE INVENTION

It is an object of the invention to provide an improved apparatus of the above-outlined type from which the discussed disadvantage is eliminated and which, in particular, makes possible a more accurate capture and measurement of further characteristics of the sliver and/or of its material.

This object and others to become apparent as the specification progresses, are accomplished by the invention, according to which, briefly stated, the draw frame for drafting a sliver includes a drafting unit having a plurality of roll assemblies spaced from one another in a direction of sliver advance. One of the roll assemblies is an output roll assembly situated at a downstream end of the drafting unit as viewed in the direction of sliver advance. A sliver guide is disposed downstream of the output roll assembly and a sliver trumpet is disposed downstream of the sliver guide. The sliver passes through the sliver guide and the sliver trumpet. An electronic camera is arranged to capture images of the sliver at a location which is downstream of the output roll assembly and upstream of the sliver trumpet. An electronic image evaluating unit is connected to the camera for receiving image signals therefrom.

The measures according to the invention make possible a more accurate quality determination of the sliver. In particular, the wider shape of the sliver prior to densifying the sliver in the sliver trumpet provides an access to details by virtue of capturing sliver images. It is a particular advantage of the invention that dependent on the resolution, an individual fiber evaluation (examination of fiber hooklets), a determination of fiber imperfections, examination of larger surfaces (for cloudiness) and judging a sliver bundle composed of several slivers as a whole is possible. The evaluated results derived from the image processing may be utilized for an optimal setting of the draw frame.

DESCRIPTION OF THE PREFERRED EMBODIMENTS

Figure 1:
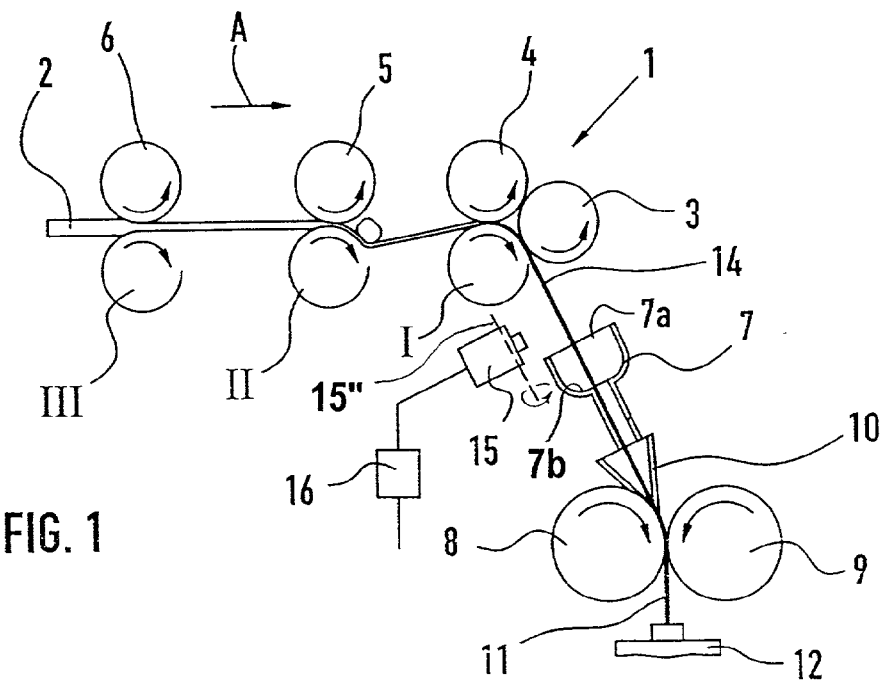
FIG. 1 is a schematic side elevational view of a drafting unit of a draw frame incorporating the invention.
Figure 4:
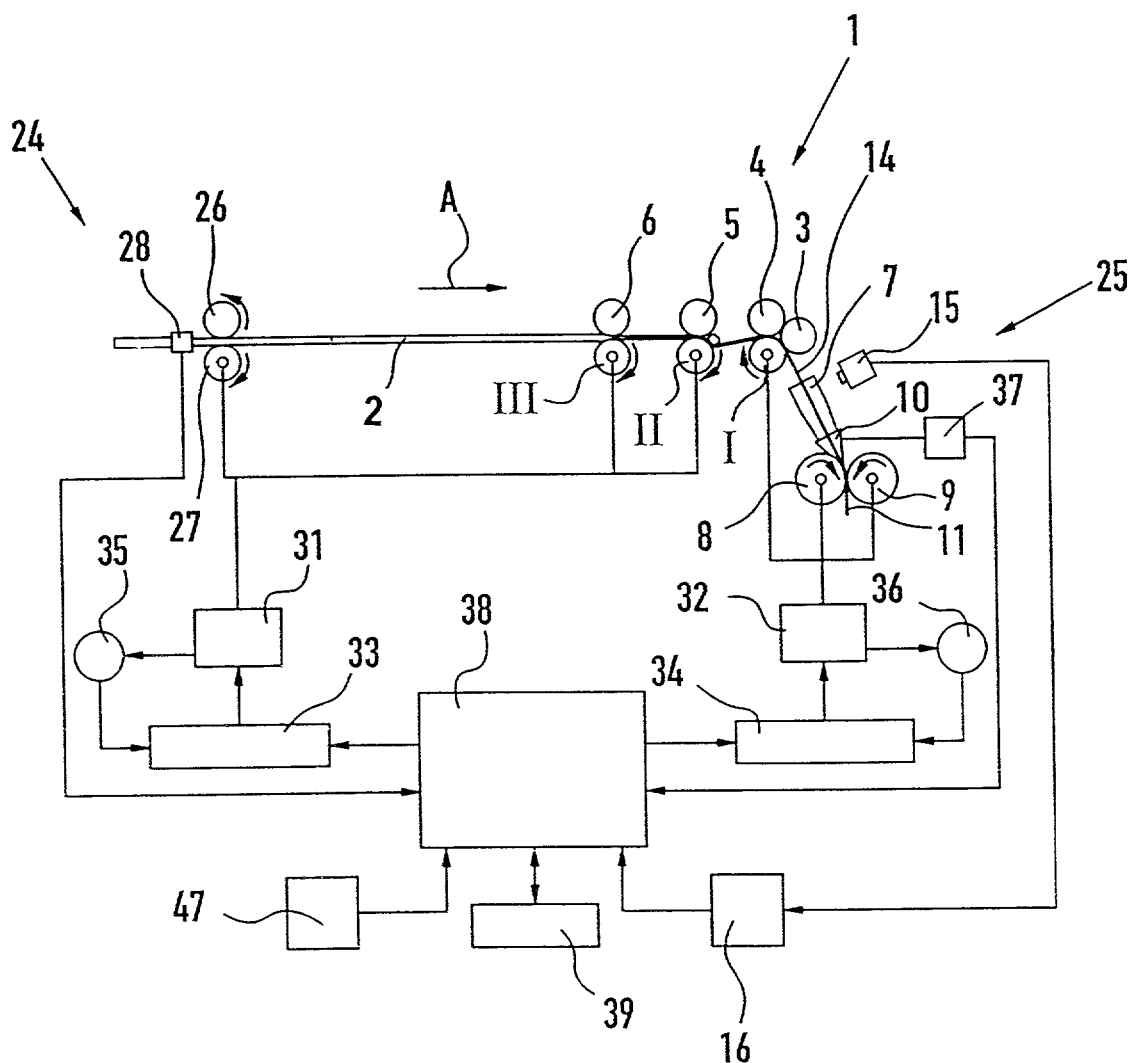
FIG. 4 is a schematic side elevational view, with block diagram, of a draw frame, incorporating the invention.

FIG. 1 illustrates a drafting unit 1 of a draw frame which may be, for example, an HSR model manufactured by Trtitzschler GmbH & Co. KG, Mönchengladbach, Germany. The slivers 2 (only one is visible in FIG. 1) are withdrawn from coiler cans and together enter the drafting unit after passing through a sensor 28 (FIG. 4).

The drafting unit 1 is a 4-over-3 construction, that is, it has a lower output roll I, a lower middle roll II and a lower input roll III as well as four upper rolls 3, 4, 5 and 6. The drafting of the sliver 2 in the drafting unit 1 occurs in a preliminary drafting field formed by the roll pairs 6, III and 5, II as well as a principal drafting field formed by the roll pair 5, II and the roll assembly 3, 4 and I. The drafted slivers, designated at 14, reach a sliver guide 7 and are, by means of calender rolls 8 and 9, pulled through a sliver trumpet 10 in which the slivers are combined into a single sliver 11 which is subsequently deposited by a sliver coiler 12 into a coiler can not shown. Between the output rolls 3, I of the draw unit 1 and the input opening 7a of the sliver guide 7 a CCD-camera 15 is disposed which is connected with an electronic evaluating device 16 (image processing unit) which, in turn, is coupled to an electronic control and regulating device 38 as shown in FIG. 4.

Figure 2:
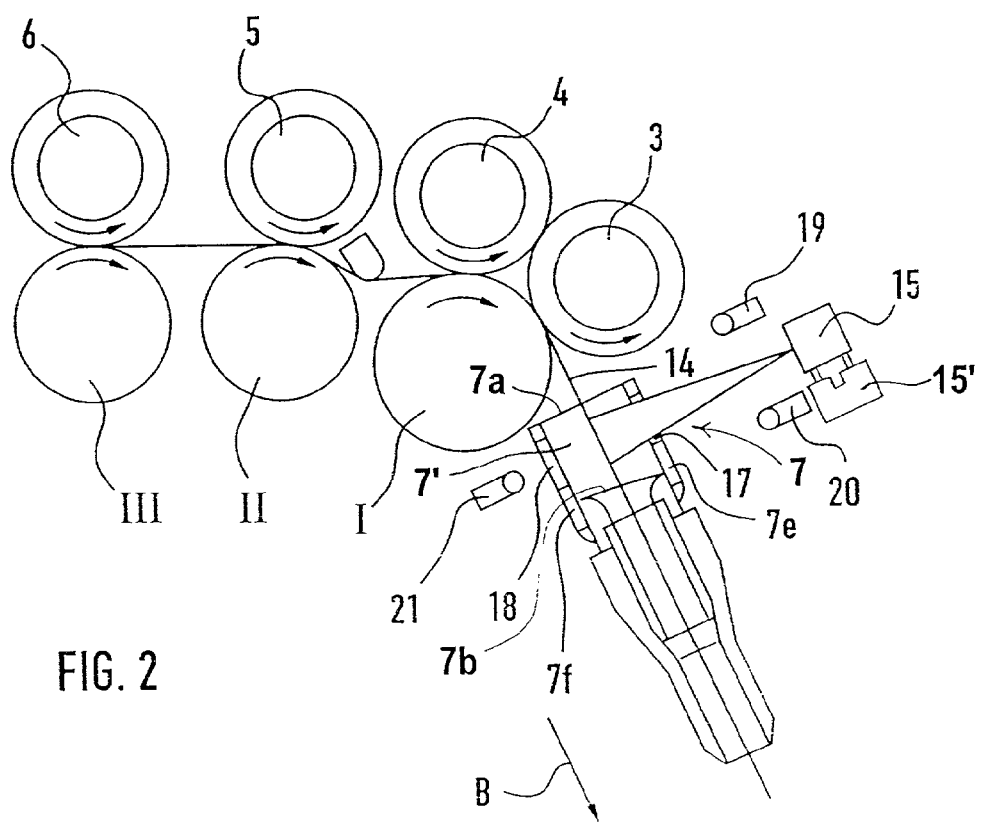
FIG. 2 is a view similar to FIG. 1, showing the construction according to the invention disposed in the region of the sliver guide.
Figure 3A:
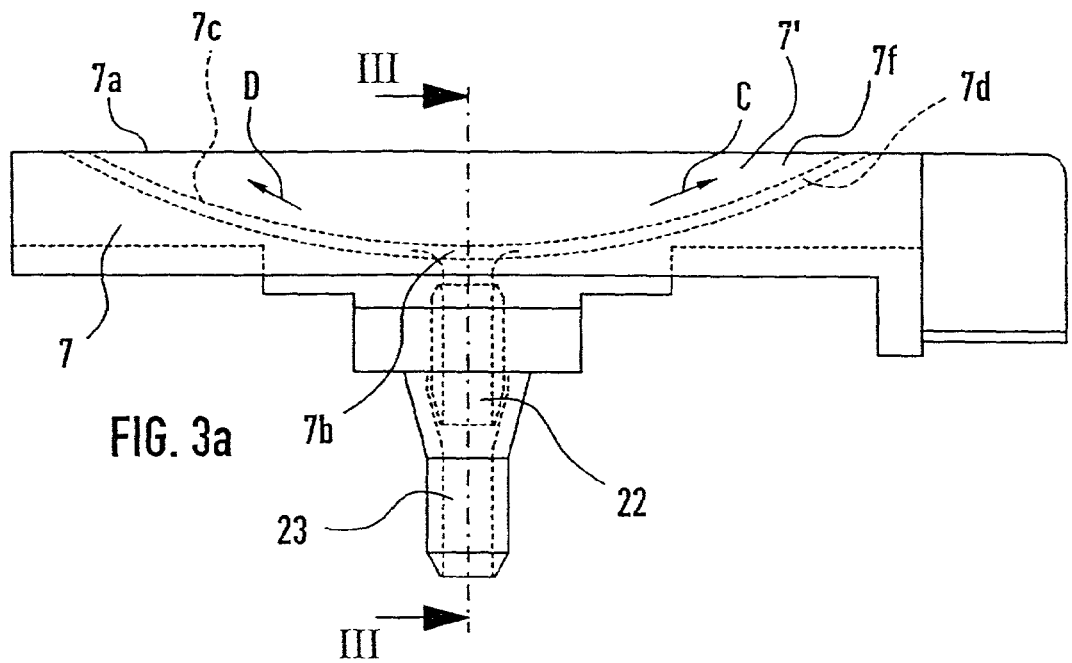
FIG. 3a is a sectional top plan view of the sliver guide.
Figure 3B:
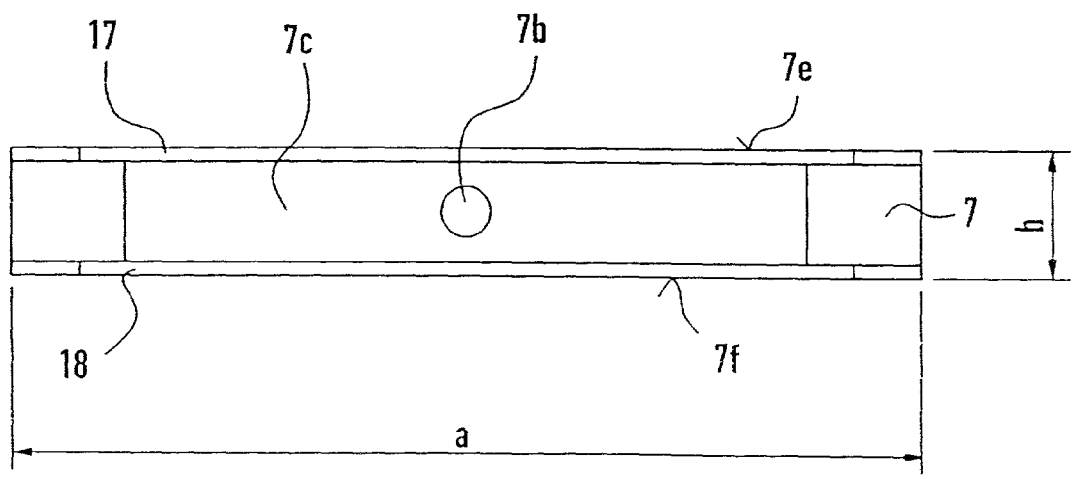
FIG. 3b is a front elevational view of the sliver guide.

Turning to FIGS. 2, 3a and 3b, the sliver guide 7 has top and bottom walls 7e and 7f provided, respectively, with a light transmitting window 17 and 18. Externally of the top wall 7e and facing the window 17, the CCD-camera 15 as well as two light emitting diodes (LED's) 19 and 20 are arranged. Spaced from the bottom wall 7f a light emitting diode 21 faces the window 18. By virtue of this arrangement the sliver 14 entering the inner space 7' of the sliver guide 7 is optically captured between the inlet opening 7a and the outlet opening 7b. The optical axis of the camera 15 is oriented perpendicularly to the advancing direction B of the sliver 14 within the sliver guide 7. The walls 7e and 7f may be pivoted open; the picture-taking occurs through the windows 17 and 18 while the walls 7e and 7f of the sliver guide 7 are in a closed position. By arranging the light diodes 19, 20 on the one hand, and the light diode 21, on the other hand, at opposite sides of the sliver guide 7, pictures in transmitted light and reflected light may be taken. The picture taking occurs both during the normal delivery speed (900 m/min and above) and during acceleration and deceleration of the sliver 14. The sliver guide 7 has an open end 7a which is its input and a sliver passage opening 7b which is its output. The inner space 7' of the sliver guide 7 is defined by two concavely converging side walls 7c and 7d as well as the planar top wall 7e and the planar bottom wall 7f. The inlet opening 7a has a larger area than the sliver passage opening 7b. The passage opening 7b is adjoined by transfer tubes 22 and 23 which guide the gathered sliver 14 into the sliver trumpet 10 shown in FIGS. 1 and 4.

During operation, the sliver 14 discharged by the roll pair 3, I enters the inner space 7' of the sliver guide 7 through the inlet opening 7a. Then the sliver impacts on the inner faces 7c and is gathered thereby and guided to the outlet opening 7b. During this occurrence the sliver 14 is densified while air is expelled therefrom which escapes into the ambient atmosphere in the direction of the arrows C and D through the inlet opening 7a in a direction against the advancing direction B.

Turning to FIG. 4, the drafting unit 1 is preceded by a drafting unit inlet 24 and is followed by a drafting unit outlet 25. The slivers 2 are, pulled by the calender rolls 26, 27, moved through the measuring member 28. In the drafting unit outlet 25 the drafted slivers 14 reach the sliver guide 7 and are, by means of the calender rolls 8 and 9, pulled through the sliver trumpet 10 in which the slivers 14 are combined into a single sliver 11, subsequently deposited in coiler cans.

The calender rolls 15, 16, the lower input roll III and the lower mid roll II which are mechanically connected to one another, for example, by a toothed belt, are driven by a regulating motor 31, while the respective upper rolls 6 and 5 are idlers driven by friction from the respective lower rolls. The regulating motor 31 receives a desired rpm value. The lower output roll I and the calender rolls 8 and 9 are driven by a principal motor 32. The regulating motor 31 and the principal motor 32 have a respective regulator 33 and 34. The rpm regulation is effected by means of a closed regulating circuit in which the regulating motor 31 and the principal motor 32 are provided with a respective tachogenerator 35 and 36. At the drafting unit inlet 24 a mass-proportional magnitude, for example, the sliver cross section of the slivers 2 are measured by the inlet measuring member 28. At the drafting unit outlet 25 the cross section of the exiting sliver 11 is sensed by an outlet measuring organ 37 associated with the sliver trumpet 10. The central computer unit (control and regulating device) 38, for example, a microcomputer with a microprocessor, transfers the setting of the desired magnitude for the regulating motor 31 to the regulator 33. The measured magnitudes sensed by the measuring member 28 are applied to the central unit 38 during the drafting process. From the measured magnitudes sensed by the measuring member 28 and the desired value for the cross section of the exiting sliver 11 in the central unit 38 the setting magnitude for the regulating motor 31 is determined. The measured magnitudes sensed by the outlet measuring organ 37 serve for monitoring the exiting sliver 11. By means of such a regulating system, fluctuations in the cross section of the inputted sliver 2 may be compensated for by a suitable regulation of the preliminary drafting process, that is, an evening of the outputted sliver 11 may be achieved. In the system illustrated in FIG. 4, 39 designates an inputting device and 16 schematically designates the image processing device, also shown in FIG. 1. The camera 15 is connected to the central unit 38 with the intermediary of the image processing device 16. By means of this arrangement the results of the image analysis may be used in a closed regulating circuit for optimizing the drafting process. The results of the image analysis of the drafted sliver 14 may be stored in a memory 47.

By means of the CCD-camera 15 pictures may be taken of the drafted slivers 14. It is also feasible to take pictures of the drafted slivers 14 by digitalized photodiodes. The evaluation of the digital image information may be performed on-line by an image analyzing software. The camera axis is oriented preferably perpendicularly to the traveling direction of the slivers 14 as they pass through the sliver guide 7. The camera 15 may be moved along the inner frame width of the machine on rails to take pictures along the working width of the drawing frame. Expediently, the camera 15 may be moved automatically away from the slivers 14 or a wide-angle setting of the camera may be effected to capture the entire sliver width. It is also feasible to pivot the camera 15 about an axis 15" in a plane perpendicular to the sliver advancing direction B to take pictures over the working width of the draw frame. Advantageously, pictures are taken in the middle sliver zone to examine the sliver for cloudiness. Grounds for such cloudiness may be an unsatisfactory short-fiber guidance, poor clamping of the sliver, or erroneous drafting unit settings. Further, pictures from such a sliver region may be used for analyzing the degree of parallelization of the slivers, the fiber hook number and size, the structural influence of the material and the generation of dust. Based on all these parameters, the quality of the drafting process may be determined. Advantageously, pictures are also taken especially of the edge zones for analyzing the guidance of the fibers in the edge zones during the drafting process (closed or discontinuous sliver image at the edges). By a width-wise scanning of the sliver by the camera it may also be determined whether longitudinally extending streaks are present in the sliver. Such streaks may appear if the slivers are improperly guided into the drafting unit, that is, the slivers are overlapping or are at an excessive distance from one another. Based on the analysis of the entire sliver width, an evaluation of the initial draft in this region may be performed. It is a further advantage of the invention that the orientation of the slivers and fibers may be analyzed since the number and the position of the obliquely and straight-running slivers represent a measure for the effective starting draft. The starting draft of the calender roll pair is dependent from the following parameters: delivery speed, draft, friction, sliver number, material, soiling, and the like. In this manner the real starting draft of the calender roll pair may be objectively sensed. Images for the fiber orientation at an optimal starting draft may be stored in the control unit 38. In particular, by means of a closed regulating circuit, the starting draft of the calender roll pair may be fully automatically or semi-automatically optimized (for example, by replacing the wheels manually).

While the invention was described in connection with a regulated draw frame, it is to be understood that the invention may find application in a non-regulated draw frame as well.

It will be understood that the above description of the present invention is susceptible to various modifications, changes and adaptations, and the same are intended to be comprehended within the meaning and range of equivalents of the appended claims.

What is claimed is:

1. A draw frame for drafting a sliver running therethrough, comprising
    (a) a drafting unit comprising a plurality of roll assemblies spaced from one another in a direction of sliver advance; one of said roll assemblies being an output roll assembly situated at a downstream end of said drafting unit as viewed in said direction of sliver advance;
    (b) a sliver guide disposed downstream of said output roll assembly; said sliver guide having an inlet opening and an outlet opening;
    (c) a sliver trumpet disposed downstream of said sliver guide; said sliver passing through said sliver guide and said sliver trumpet;
    (d) an electronic camera arranged to capture images of the sliver at a location situated downstream of said output roll assembly and upstream of said sliver trumpet;
    (e) an electronic image evaluating unit connected to said camera for receiving image signals therefrom;

(f) an electronic machine control device connected to said electronic image evaluating unit; and (g) a closed circuit, including said electronic machine control device and said electronic image evaluating unit, wherein said electronic machine control device is adapted to adjust and optimize at least one of speed and friction parameters of at least one of the plurality of roll assemblies in response to results of said electronic image evaluating unit via said closed circuit.

2. The draw frame as defined in claim 1, wherein said location is situated between said output roll assembly and said inlet opening of said sliver guide.

3. The draw frame as defined in claim 1, wherein said location is situated between said inlet and said outlet of said sliver guide.

4. The draw frame as defined in claim 1, wherein said location is situated between said output roll assembly and said inlet opening of said sliver trumpet.

5. The draw frame as defined in claim 1, wherein said location is situated between said output roll assembly and said inlet opening of said sliver guide; the sliver being unsupported between said output roll assembly and said inlet opening of said sliver guide.

6. The draw frame as defined in claim 1, further comprising means for moving said camera transversely to said direction of sliver advance.

7. The draw frame as defined in claim 1, wherein said electronic machine control device connected to said electronic image evaluating unit comprises a computer and a microprocessor.

8. The draw frame as defined in claim 1, wherein said camera is a CCD-camera.

9. The draw frame as defined in claim 1, wherein said camera has a picture taking axis oriented perpendicularly to said direction of sliver advance.

10. The draw frame as defined in claim 1, wherein said camera is pivotal in a plane oriented perpendicularly to said direction of sliver advance.

11. The draw frame as defined in claim 1, further comprising sliver-illuminating light sources disposed on either side of the sliver at said location for capturing pictures with said camera in transmitted and reflected light.

12. The draw frame as defined in claim 1, wherein said electronic machine control device includes a memory for storing therein evaluated measuring results derived from images taken by said camera.

13. The draw frame as defined in claim 1, wherein said camera is a line camera.

14. The draw frame as defined in claim 1, wherein said camera is a diode matrix camera.

15. The draw frame as defined in claim 1, wherein the sliver guide comprises a top wall including a top light transmitting window, and a bottom wall including a bottom light transmitting window, wherein the electronic camera is arranged to capture images of the sliver through at least one of the light transmitting windows.

16. The draw frame as defined in claim 15, wherein the electronic camera is directed toward the top light transmitting window.

17. The draw frame as defined in claim 16, further comprising at least one light emitting diode located adjacent the top light transmitting window and arranged to direct light toward the top light transmitting window.

18. The draw frame as defined in claim 17, further comprising at least one additional light emitting diode located adjacent the bottom light transmitting window and arranged to direct light toward the bottom light transmitting window.

* * * * *